No. 737,633. PATENTED SEPT. 1, 1903.
F. W. JOHNSON.
DEVICE FOR PREVENTING REFILLING OF BOTTLES.
APPLICATION FILED DEC. 24, 1902.
NO MODEL.
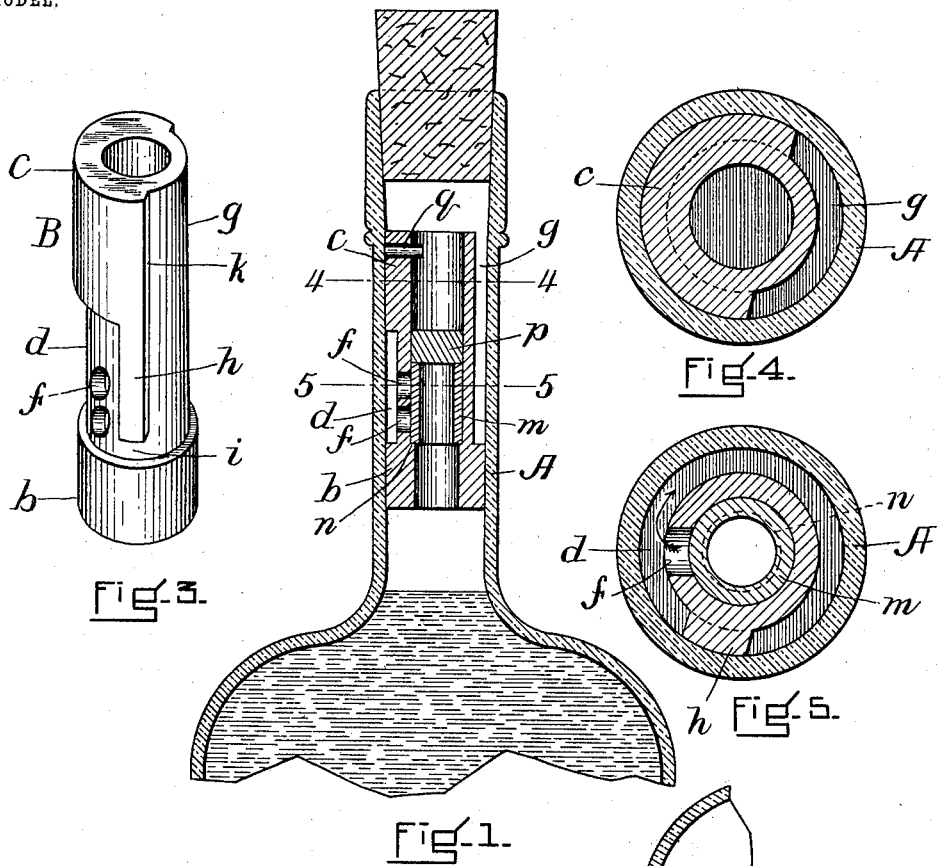
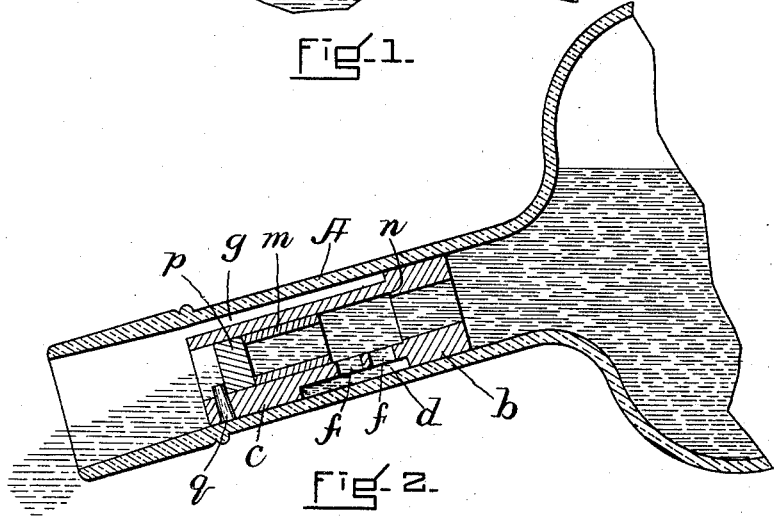
WITNESSES.
Fred. E. Dorr.
F. B. Spaulding
INVENTOR.
Frederick W. Johnson No. 737,633.

Patented September 1, 1903.

UNITED STATES PATENT OFFICE.

FREDERICK W. JOHNSON, OF WALTHAM, MASSACHUSETTS.

DEVICE FOR PREVENTING REFILLING OF BOTTLES.

SPECIFICATION forming part of Letters Patent No. 737,633, dated September 1, 1903.

Application filed December 24, 1902. Serial No. 136,460. (No model.)

*To all whom it may concern:*

Be it known that I, FREDERICK W. JOHNSON, a citizen of the United States, residing at Waltham, in the county of Middlesex and State of Massachusetts, have invented an Improved Device for Preventing the Refilling of Bottles, of which the following is a specification.

My invention relates to certain improvements on the device for preventing the refilling of bottles for which Letters Patent of the United States No. 701,048 were granted to me May 27, 1902, and has for its object to secure greater freedom in the outpour from the bottle and also to more effectually prevent the possibility of refilling the bottle after having been emptied.

To this end my invention consists in certain novel features and details of construction, as hereinafter more fully described, and pointed out in the claims.

In the accompanying drawings, Figure 1 is a vertical section through the neck of an ordinary bottle having my improved device applied thereto. Fig. 2 is a similar section showing the position of the parts when the bottle is tipped to pour out the liquid which it contains. Fig. 3 is a perspective view of the device removed from the bottle-neck. Fig. 4 is an enlarged horizontal section on the line 4 4 of Fig. 1. Fig. 5 is an enlarged horizontal section on the line 5 5 of Fig. 1.

In the said drawings, A represents the neck of an ordinary glass bottle, within which after the bottle has been filled is inserted and securely fastened by cement or otherwise a cylindrical casing B, which is composed of glass or other suitable material and is open at both ends to form a straight passage therethrough. This casing is provided at its bottom with a wide flange or head $b$, extending entirely around it, and at its top with a wide flange or head $c$, extending only partially around it, as shown particularly in Figs. 3 and 4, said heads snugly fitting the interior of the bottle-neck and forming between them when the casing is in place therein an annular chamber $d$, which communicates with the interior of the casing A through a series of openings $f$, longitudinally disposed in a straight line on one side only of said casing between said heads, as shown in Figs. 1, 2, and 3. By thus forming the upper head to extend only partially around the casing a wide channel or passage $g$ is formed between the casing and the interior of the bottle-neck, which affords plenty of space for the free discharge of all the liquid flowing from the holes $f$ into the chamber $d$ and also for the simultaneous entrance of sufficient air to permit of this free flow, the outflowing liquid occupying the lower portion of the channel and the inflowing air the upper portion thereof when the parts are in the position shown in Fig. 2.

Extending from the bottom of the upper head $c$ to a point near the upper edge of the lower head $b$ is a narrow rib or projection $h$, flush with said heads and fitting snugly against the interior of the bottle-neck, said projection $h$ forming a longitudinal partition in the chamber $d$, with a narrow passage $i$ opposite or close to the hole $f$ nearest to the head $b$. This partition forms a separator and compels the liquid escaping from the holes $f$ to pass around to the lower portion of the channel $g$, while the inflowing air occupying the upper portion of the channel will follow along and be guided by the edge $k$ of the head $c$ and the edge of the projection $h$ in line therewith until it reaches the passage $i$, through which it will pass and enter the upper portion of the adjacent hole $f$, which is uppermost when the bottle is tipped, as shown in Fig. 2, the air being thus supplied in sufficient quantity to produce a steady and uniform outflow of the liquid from the bottle through the wide channel $g$.

Within the interior of the casing A is fitted to slide longitudinally therein a tubular valve $m$, open at both ends and adapted when the bottle is in an upright position to rest against an annular internal shoulder $n$, which forms a seat therefor, said valve when on its seat closing both openings $f$, as shown in Fig. 1. Above the valve $m$ is placed a solid plug $p$, which is free to slide up and down within the casing and forms a stopper for closing the mouth of the casing, the valve and the stopper being prevented from falling out of the casing when the bottle is inverted by means of a suitable stop, preferably consisting of a pin $q$, passing through a hole in the top of the casing and projecting into its mouth, the head of the pin being flush with the exterior surface of the head c, so that when the casing is cemented into the neck of the bottle it will be impossible to remove it.

It will be seen that the holes f are directly beneath the head c, which forms a guard to prevent the possibility of passing a wire or other implement through said holes and beneath the valve m when away from its seat for the purpose of holding it up and leaving the holes open for the passage of liquid attempted to be forced into the bottle to refill the same.

When the bottle is tipped down below a horizontal position, the plug p and hollow valve m will slide down toward the mouth of the casing until arrested by the contact of the plug with the pin q, as shown in Fig. 2, thus uncovering the openings f, through which the liquid in the bottle will flow out freely into the chamber d and thence around the casing, as shown by the arrow in Fig. 5, to the channel g and mouth of the bottle, from which it will be discharged in a steady uniform stream by reason of the simultaneous entrance of a proper supply of air, as previously described. If the bottle is held in a horizontal position, the air will not enter to permit the liquid to flow out; but when the bottle is tipped down below a horizontal line the liquid is divided and broken up by the partition between the openings f, thus affording an entrance for the air which will pass in from the passage i and enter the opening f nearest thereto, which is at that time the upper one, while the greater part of the liquid will flow out through the opening nearest the head c.

If an attempt should be made to refill the bottle when submerged in a horizontal position with the valve m in a position not covering the openings f, the liquid will in attempting to pass through said openings f be met and arrested by the pressure of the air in the bottle, which must necessarily escape before the liquid can enter, the pressure being thus equalized, and in the meantime the pressure of the liquid entering the larger open outer end of the casing will at once act with undiminished force on the loose plug p and instantly force it inward, together with the valve m, until the latter reaches its seat, when the openings f will be closed and the passage through the casing and valve m stopped by the plug p, thus effectually preventing the entrance of liquid into the bottle.

By the employment of the sliding tubular valve m in connection with a solid loose plug or stopper arranged above the same it will be impossible to raise the valve by suction applied to the mouth of the casing, as the only effect will be to raise the plug p, the suction having no effect on the tubular valve m, as it is open at both ends.

What I claim as my invention, and desire to secure by Letters Patent, is—

1. The combination with a bottle-neck, of a cylindrical casing open at both ends to form a straight uninterrupted passage therethrough and having upper and lower heads forming between them an annular chamber and openings on one side only leading from its interior into said chamber and arranged in a single straight line between said heads, a tubular valve open at both ends and free to slide within said casing to cover and uncover the side openings therein, a sliding plug or stopper arranged above said valve and adapted to close the straight passage through the casing, and means for retaining the valve and plug within the casing.

2. A device for preventing the refilling of bottles comprising a cylindrical casing open at both ends to form a straight uninterrupted passage therethrough and having end flanges or heads adapted to fit tightly within the neck of a bottle to form an annular chamber therein and openings on one side only arranged in a single straight line between the heads, the lower head extending entirely around the casing and the upper head only partially around the same, forming a wide channel for the discharge of the liquid and the entrance of air, a longitudinal rib or partition extending from the upper toward the lower head forming a guide for the air with a transverse opening between its end and the lower head for the passage of the air to the adjacent opening in the wall of the casing, and means movable within the casing for closing the straight passage therethrough.

3. The combination with a bottle-neck, of a cylindrical casing open at both ends to form a straight uninterrupted passage therethrough and having heads or flanges at its opposite ends fitting tightly within the bottle-neck and forming between them an annular chamber, the upper head extending only partially around the casing leaving a wide channel for the simultaneous escape of the liquid from said chamber and the entrance of air into the same, said casing having a series of openings on one side only leading from its interior into said chamber and arranged in a single line between said heads, a longitudinal projection forming a partition extending from the upper head nearly to the lower head leaving a transverse opening at its lower end for the passage of air to the adjacent opening in the side of the casing, a tubular valve open at both ends and free to slide within the casing to open and close the openings in the side thereof, a seat for said valve, a loose plug or stopper arranged within said casing above said valve, and a stop at the outer end of the casing to retain said plug and valve therein.

Witness my hand this 18th day of December, A. D. 1902.

FREDERICK W. JOHNSON.

In presence of—
P. E. TESCHEMACHER,
F. B. SPAULDING.